Feb. 5, 1946.   W. S. CALCOTT ET AL   2,394,291
CONTINUOUS PROCESS FOR PREPARING DISPERSIONS
OF POLYMERIZED ELASTOGENIC DIENES
Filed Dec. 9, 1939
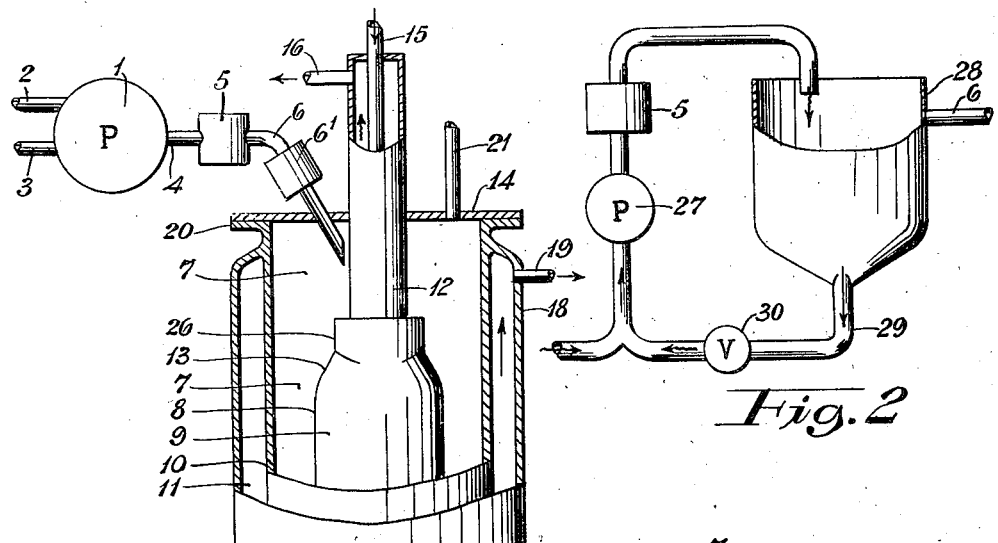
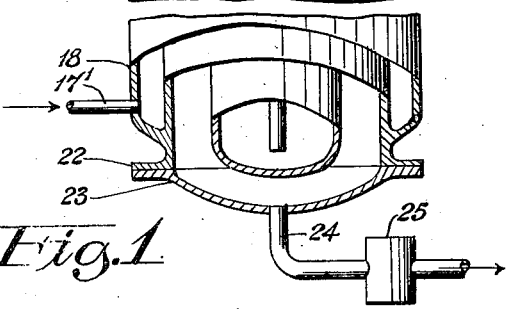
Fig.1
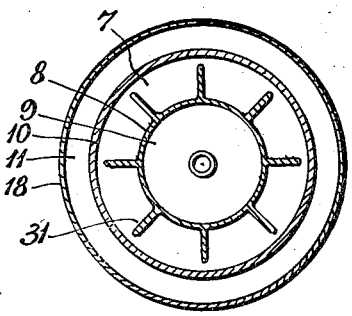
Fig.3
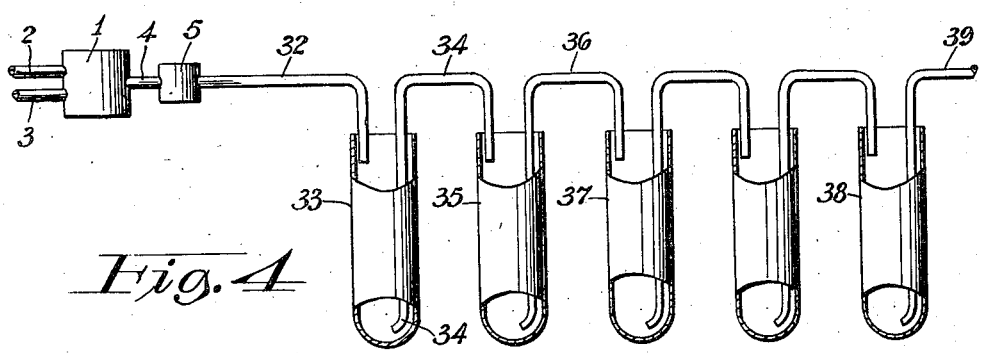
Fig.4
William S. Calcott
Howard W. Starkweather INVENTORS
BY Hugh M. Clark
ATTORNEY Patented Feb. 5, 1946

2,394,291

UNITED STATES PATENT OFFICE 2,394,291

CONTINUOUS PROCESS FOR PREPARING DISPERSIONS OF POLYMERIZED ELASTOGENIC DIENES

William S. Calcott, Woodstown, N. J., and Howard Warner Starkweather, Wilmington, Del., assignors to E. I. du Pont de Nemours & Company, Wilmington, Del., a corporation of Delaware Application December 9, 1939, Serial No. 308,386

1 Claim. (Cl. 260—92.7)

This invention relates to a continuous method for the polymerization of polymerizable, elastogenic, organic materials. More particularly, the invention relates to a continuous process for the polymerization of halogen-2-butadiene-1,3.

It is well known that chemical operations, particularly on a large scale, may be run more efficiently and at lower operating costs if carried out continuously rather than by batch operation. Since, however, most polymerizable substances change progressively from thin liquids to solids during the course of the polymerization, the direct and complete continuous polymerization of such substances involves many serious mechanical difficulties. In U. S. Patent No. 2,161,481, polymerizable compounds, particularly methyl methacrylate, are polymerized in aqueous dispersion by upward passage through a long, inclined, heated tube of such construction, and at such a rate, as to create turbulent flow. In some cases, however, particularly when rubberlike products (such, for example, as polymers of halogen-2-butadiene-1,3) result from the polymerization, the dispersed phase, when in a partly polymerized state, tends to separate irreversibly, thus clogging the tubes, which, because of their necessary length, narrowness, and tortuosity, are very difficult to clean.

It is an object of this invention to discover a process whereby polymerizable, elastogenic, organic materials may be continuously polymerized without inducing separation of the dispersed phase. Another object is the discovery of a process for continuously polymerizing polymerizable, elastogenic, organic materials wherein there is a minimum of mixing between the monomeric material and the polymers thereof. A further object is the discovery of an improved process for the continuous polymerization of elastogenic, organic materials to form rubber-like polymers. Other objects will appear hereinafter. (Elastogenic, as used throughout this application, means capable of forming rubber-like materials.)

These objects have been accomplished according to the present invention by causing a dispersion of the polymerizable, elastogenic material to be continuously polymerized while passing the dispersion slowly downward through a polymerization chamber in such manner as to avoid mixing, and continuously withdrawing from the lower part of the polymerization vessel a dispersion of the polymerized material at the desired degree of polymerization. In order to avoid turbulence or other types of mixing, the volume of the stream of the dispersion is relatively large and its rate of flow is very low.

The preferred method for preventing this undesirable mixing of dispersions in successive stages of polymerization consists in causing the dispersion to be polymerized to flow slowly downward through a vessel of relatively large cross-section, whereby mixing is largely avoided since the density of the dispersion of polymerizing material increases continuously as the polymerization proceeds.

Figure 1 of the drawing is an elevation, partly in section, of one form of apparatus suitable for carrying out the invention.

Figure 2 of the drawing is an elevation, partly in section, of a recirculating system which may be used in dispersing the material to be polymerized.

Figure 3 is a section through an apparatus similar to that of Figure 1, but somewhat modified.

Figure 4 is an elevation, partly in section, of an alternative apparatus for carrying out the invention. None of the figures are drawn strictly to scale, and all of the figures are diagrammatic.

In order that the process may be more fully understood, the following examples and descriptions of the drawing are given. It is to be understood, however, that the invention is not limited thereto, but suitable variations may be made as will become more apparent hereinafter.

Figure 1 represents a diagrammatic view of the preferred form of the apparatus, parts of the apparatus being broken away and shown in cross-section and only the upper and lower ends of the apparatus being shown. In this figure, 1 is a proportioning pump into which the polymerizable, elastogenic, organic material and the dispersing medium are fed through separate pipes 2 and 3. The mixture from the proportioning pump 1, mixed in the desired constant proportions, is fed through delivery pipe 4 to turbulent flow tube 5 in which the polymerizable material is dispersed in the dispersing medium. The dispersion, leaving turbulent flow tube 5, flows through delivery tube 6 and preheater 6' into polymerizing chamber 7 which consists of an annular space between the wall 8, of an inner heat exchange chamber 9, and the inner wall 10 of an outer heat exchange chamber 11. The upper part 12 of the inner heat exchange chamber 9 is a cylinder of smaller diameter than the lower part thereof and is connected to the lower part by a conical member 13. The upper portion 12 is attached to cover plate 14. Extending from the top of the inner heat exchange chamber 9 downward to near the bottom thereof is inlet tube 15, and attached near the top of member 12 is outlet tube 16. The outer heat exchange chamber 11 has an inlet tube 17 attached near the bottom of the outer wall 18 and an outlet tube 19 attached near the top of outer wall 18. A heat exchange medium, for example, water, is circulated through the inner and outer heat exchange chambers 9 and 11 by means of inlets 15 and 17 and outlets 16 and 19. The temperature and rate of circulation of the heat exchange medium are chosen so as to maintain polymerization chamber 7 at the desired temperature. Inner wall 10 and outer wall 18 of the outer heat exchange chamber are united near the top and terminate in the flange 20 to which cover plate 14 is attached by any suitable means such, for example, as bolts. Vent tube 21 is placed in cover plate 14. Delivery tube 6 also passes through cover plate 14. Inner wall 10 and outer wall 18 of the outer heat exchange chamber 11 are also united near the bottom of the chamber and there terminate in flange 22 to which is attached bottom plate 23. Suitable gaskets may be used between the flanges 20 and 22 and the top and bottom plates 14 and 23 respectively. Outlet tube 24 connects bottom plate 23 with flow regulating device 25. The dispersion entering polymerization chamber 7 through delivery tube 6 flows over conical member 13 and thus is evenly distributed in the polymerization chamber 7 in which the level of the liquid is maintained near the bottom of conical member 13. The even distribution of the liquid may be further assisted by collar 26 mounted on conical member 13. The dispersion moves slowly downwardly through chamber 7 and out through outlet tube 24. The regulating device 25 is so adjusted that the level of the dispersion in the polymerization chamber remains approximately constant. This regulating device may be of any suitable known construction, such, for example, as a valve which opens when the liquid on one side exceeds a certain pressure, or, preferably, a vertical tube with an overflow at the top.

The flow regulating device 25 and the speed of pump 1 may be chosen so as to maintain the desired level of dispersion in polymerization chamber and, at the same time, to maintain the desired rate of passage of dispersion through the polymerization chamber. In one form of this apparatus, the height of the polymerization chamber 7 from flange 22 to conical member 13 is 7 feet, the inside diameter of wall 10 is 10 inches, and the outside diameter of wall 8 is 6 inches, thus giving the polymerization chamber 7 a width of 2 inches between inner wall 8 and outer wall 10. For cleaning and inspection of the apparatus, it is only necessary to disconnect cover plate 14 and bottom plate 23 at the connecting flange and remove inner heat exchange chamber 9 bodily from the polymerization chamber.

The material of which the polymerizing apparatus is constructed should, of course, be such that it is not dissolved or corroded by the material being polymerized and by the emulsifying solution and other agents used. It should also have no undesirable catalytic effect upon the polymerization and should not induce coagulation. The portion through which heat interchange is to take place, such as the walls 8 and 10, should, of course, have good heat conductivity. Metal having a coating of glass, ceramic enamels, or synthetic resins such as the phenol-formaldehyde resin "Heresite" can be used to good advantage. It is desirable to avoid having joints between dissimilar metals in contact with the dispersion since such joints set up electrical currents which may cause coagulation. It has been found that the dispersion is particularly sensitive to such effects while it is polymerizing and is more stable in both the unpolymerized and completely polymerized states.

A typical operation of this apparatus will now be described with reference to an aqueous dispersion of chloroprene (chloro-2-butadiene-1,3).

Chloroprene, which is substantially free from monovinylacetylene, divinylacetylene, acetaldehyde and dichlorobutene and containing 0.5 per cent of dissolved sulfur and 4 per cent of rosin is admitted through tube 2 to the proportioning pump 1, and water containing 0.2 per cent ammonium persulfate, 0.3 per cent sodium hydroxide and 0.2 per cent of the sodium salts of the dinaphthyl methane sulfonic acids obtained from naphthalene, sulfuric acid, and formaldehyde according to U. S. Patent No. 1,191,480 is admitted to pump 1 through tube 3. The pump 1 is adjusted so that the ratio of the chloroprene solution to the aqueous solution is as 1 is to 3, and so that the resulting dispersion flows to the polymerizing chamber 7 at such a rate that any given sample of its remains therein for 1.5 hours. The flow of the cooling liquid through inner heat exchange chamber 9 and outer heat exchange chamber 11 is adjusted so that the temperature of the polymerizing dispersion does not exceed 42° C. at any point. The latex issuing from 25 contains the chloroprene polymer substantially devoid of monomeric chloroprene, and is similar to the latex used in Example 16 of the copending application of Youker, Serial No. 264,581, filed March 28, 1939, which has matured into U. S. Patent No. 2,234,215, patented March 11, 1941.

It may be treated, as in this example, with a dispersion of phenyl-beta-naphthylamine and enough dilute (5%) acetic acid to render the latex acid to litmus, both of which may be continuously added by means of a proportioning pump or pumps, operating in coordination with that used in preparing the emulsion. Other suitable ways of treating the latex consist of continuously adding acetic acid and an aqueous dispersion of tetraamyl, tetrabutyl, or tetramethyl thiuram disulfide. The treated latex is then allowed to flow directly to a continuous coagulating apparatus such as is described in Example 4 of the copending application of Calcott and Starkweather, Serial No. 107,332, filed October 24, 1936, and now matured into U. S. Patent No. 2,187,146, issued January 16, 1940. In this apparatus the latex is coagulated in the form of a thin continuous sheet by allowing the latex to freeze in a thin layer on the surface of a rotating internally cooled drum, allowing the thin layer to remain in contact with the freezing surface for a length of time such that a continuous sheet of completely coagulated material is formed on removing the film from the drum, and allowing the ice to melt. This sheet may then be continuously washed and dried as described in the above-identified application.

The apparatus described above for continuous polymerization may be further modified. For example, instead of bringing about emulsification by passage through a tube producing turbulent flow, the mixture of chloroprene and dispersing solution may be passed through a centrifugal pump, colloid mill, or other device in which the liquid is subject to vigorous agitation and mixing.

If insufficient emulsification is brought about by one passage through such a device, the recirculating system shown in Figure 2 may be used with the emulsifying device represented by 5 in Figure 1. In this, the mixture of materials from the proportioning pump 1 in Figure 1 passes through the pump 27 and the emulsifying device 5 and thence into a reservoir 28 which is connected by a tube 29 through the valve 30 to the intake side of the pump 27 and is also connected by the delivery tube 6 to the polymerization chamber 7. By varying the speed of the pump 27, varying proportions of unemulsified material and material from 28 may be circulated through the pump since the rate at which the unemulsified material is delivered to 27 is constant. The ratio may also be varied by changing the flow of the recirculated material through the valve 30. Thus, any desired degree of recirculation through the emulsifying device 5 may be obtained. Element 5 may be any of the emulsifying devices disclosed above and may be omitted from the circuit when sufficient emulsification is produced by the pump 27. The reservoir 28 may be conveniently placed at such a height that the level of liquid therein is the same as in the polymerizing chamber. The temperature of reservoir 28 may be controlled by a bath (not shown), if desired. Alternatively, several similar or different emulsifying devices may be used in series.

The apparatus described applies the heat exchanging liquid at nearly the same temperature to all parts of the polymerization chamber. Consequently, since most of the heat of polymerization is given off at early stages of the reaction, it will be found that the polymerizing dispersion is at a higher temperature near the top than at lower points in the polymerization chamber. If it is desired, on the one hand, to keep the temperature substantially constant throughout the polymerization, or, on the other hand, to maintain different parts of the polymerization at widely different temperatures, two or more independently cooled or heated heat exchange devices may be provided for different stages of the polymerization. Thus, in Figure 1, heat exchange members 9 and 11 may be divided horizontally into two or more sets of chambers through which water is separately circulated or the polymerizing dispersion may be passed through two or more polymerization vessels similar to that shown in Figure 1 except that they are shorter and are operated at different temperatures.

Still other forms of apparatus equivalent to that shown in Figure 1 may be used according to individual circumstances. Thus, the polymerization vessel, instead of being annular in section, may consist of one or more straight tubes or passages of other cross-section passing downward through a bath for heat exchange. Thus, for example, polymerization vessels of the same area of cross-section as 7 in Figure 1 may consist of a group of 16 tubes 2 inches in diameter arranged in parallel, a single tube 8 inches in diameter, or a single flat passage of rectangular cross-section, 25.1 by 2 inches or 50.2 by 1 inch. In this general form of apparatus, it is, of course, not necessary that the polymerization vessel be vertical. It may be inclined, if desired, to any extent, provided that the inclination is such as still to take advantage of the increasing density of the dispersion as the polymerization proceeds. In the apparatus described in Figure 1, the ratio of the cross-section area (expressed in square inches) to the height (expressed in inches) is approximately 1 to 1.7. The ratio of length to the cross-section is not critical. The polymerization chamber should not be so wide that substantial mixing of the dispersion takes place or that the heat exchange is inefficient. Much smaller relative cross-sections are, of course, operable, but may be undesirable because of the increasing difficulty of construction and cleaning.

Mixing of dispersions in different stages of polymerization may also be controlled by the introduction of partitions into the polymerization chamber. Thus, the chamber 7 in Figure 1 may be divided by radial vanes arranged parallel to the axis of the apparatus and attached to the wall 8 of the inner chamber 9. A horizontal cross-section perpendicular to the axis in such an assembly is given in Figure 3 in which 7, 8, 9, 10, 11, and 18 have the same meaning as in Figure 1, and the radial vanes are indicated by 31. By such an arrangement, the thickness of the annular chamber 7 and, therefore, the capacity of the apparatus may be increased without increasing the danger of mixing of the dispersion, while still keeping the apparatus relatively simple and easily cleaned. Instead of a number of vanes dividing the chamber longitudinally, we may use one or more partitions passing helically through the annular space and thus dividing it into one or more helical passages of approximately rectangular cross-section. The cylindrical chambers discussed above as alternative forms of the polymerization chamber may likewise be divided to advantage by either longitudinal or helical partitions.

It is sometimes advantageous, as referred to above, for example, when various stages of the polymerization are to be carried out at different temperatures, to pass the material to be polymerized through a series of separate vessels. These may be each of construction like the polymerization vessels described above, or they may be of different design. Polymerization equipment of this type is shown diagrammatically in Figure 4, which is an elevation, partly in section, of such an apparatus. The monomeric substance to be polymerized is mixed with the dispersing solution in the proportioning pump 1 and emulsified by passage through the tube 5 as described in connection with the apparatus shown in Figure 1. The emulsion is then delivered through the tube 32 to the first polymerization vessel 33 in which the level of the liquid is just above the end of 32. Vessel 33 is immersed in a bath (not shown) for temperature control. An outlet tube 34 leads from the bottom of 33 to a point just below the level of the liquid in the next polymerization vessel 35, which is likewise immersed in a bath and is connected by an outlet tube 36 in a similar manner to the next polymerization vessel 37, which is similarly connected to the next vessel and so on to the last polymerization vessel 38 from which the outlet tube 39 delivers the final latex. As in the other forms of apparatus already described, the rate of flow is regulated so that the material has reached the desired degree of polymerization when it leaves the system. The tubes 34, 36, etc. for handling the partly polymerized dispersion are of such a diameter that no turbulence is produced at the velocity at which they are operated. The conditions of velocity, viscosity, diameter, etc. which lead to turbulent flow are fully discussed by Osborne Reynolds in Philo. Trans. (London), vol. 174, p. 935 et seq. (1883).

The exact form of apparatus selected will depend in part upon the speed and heat of the polymerization to be carried out. Thus, when much heat is rapidly evolved, the construction should give a large cooling surface and fairly narrow passages. On the other hand, with a slowly polymerizing latex, the density gradient is small and it is increasingly important to avoid mixing, either by the use of a much elongated chamber or by the use of the various partitions discussed above.

A filter to remove solid impurities can be inserted at any point before the dispersion enters the polymerization chamber.

While various forms of apparatus for carrying out the present invention have been shown and described, it is to be understood that the primary object of this invention is to develop a continuous process for the polymerization of polymerizable, elastogenic, organic materials. This process has as an essential feature thereof the slow passage of a dispersion of polymerizable material downwardly through a polymerizing zone in such manner as to minimize or prevent mixing of the polymerizable material in various degrees of polymerization. It is to be noted that the present invention is directed to dispersions of polymerizable materials rather than to mass polymerization. When material is polymerized in the massive state, there is a relatively great change in density between monomer and polymer and between lower polymers and higher polymers. When dealing with dispersions, the density of the dispersion is a function of the density of the dispersing phase, and is also a function of the density of the dispersed phase. As the dispersed phase becomes more dense as a result of polymerization, there is a gradual increase in density of the dispersion, but this increase is relatively small in amount, for example, the density of a typical aqueous dispersion of monomeric chloroprene is 0.99 at 20° C. When the chloroprene has been polymerized according to the described process using the apparatus of Figure 1, the density of the dispersion leaving the polymerization zone is 1.06 measured at 20° C. This difference in density is so small that it is unexpected that such change in density could be used to avoid undesirable mixing of the chloroprene dispersion in various stages of polymerization. It has been found, however, that where agitation of the dispersion is substantially avoided and where the dispersion subject to conditions of polymerization is allowed to move slowly downward, the tendency for mixing to occur is reduced to a minimum. This downward motion is preferably in a vertical direction since the force of gravity reaches its maximum effect under such conditions. However, it is possible to carry out the process according to the present invention in polymerization chambers which are inclined, as long as the inclination is such that the vector of the gravitational force in the direction in which the dispersion is moving is substantial in amount. It is, of course, obvious that the relation of the velocity of motion to the cross-section area of the polymerization chamber must be one which produces non-turbulent flow. In fact, the flow is not only non-turbulent, but does not approach the critical value at which non-turbulence changes to turbulence, and, in the preferred form of invention, is many times smaller than this critical velocity. When operated under these conditions, it is possible to almost eliminate the presence of monomeric material in the dispersion of polymerized material withdrawn from the lower end of the polymerization zone.

The process, according to the present invention, is suitable for producing dispersions of polymerized organic materials of all kinds. The process is especially useful, however, where the dispersed phase is a polymerizable, elastogen, organic material. The organic compounds which are preferred are those containing conjugated double bonds which, upon polymerization, yield a rubber-like polymer. Examples of such materials are butadiene, isoprene, chloroprene, bromoprene, chloro-2-methyl-3-butadiene-1,3, etc., as well as their mixtures with each other or with other polymerizable materials. Chloroprene is especially preferred. While monomeric, polymerizable, elastogenic, organic materials may be dispersed by turbulent flow to obtain dispersions which are stable while monomeric, the use of turbulence during polymerization is undesirable for these polymerizing dispersions because they are unstable under such conditions and produce clogging of the apparatus due to the precipitated dispersed phase. Moreover, it is clear that all mixing either by turbulence or otherwise tends to produce an effect which the present process is attempting to avoid; that is, the mixing of dispersions containing dispersed phases in various stages of polymerization. While a certain amount of mixing is not particularly undesirable when dealing with certain types of polymerization, the polymerization of polymerizable, elastogenic organic compounds presents a different problem. For example, where the polymerizable material does not produce rubber-like polymers and the dispersed polymer is to be used as a coating composition, or is to be separated out of the dispersion and used as a resin, the intermingling of the material in various degrees of polymerization may actually be advantageous. Where the product is to be a rubber-like material, such for example, as chloroprene polymers, mixing of polymers to a substantial extent is undesirable. The nature of the products vary considerably with various degrees of polymerization. Where substantial mixing occurs, the products obtained will contain some polymers which, because of overpolymerization, have lost their rubber-like properties, or, if polymerization is stopped soon enough to prevent this, the products will contain a high proportion of unpolymerized material. In the first case, the product will be inferior as a rubber-like material, while, in the second case, a marked decrease in the yield of polymer results. Best results are accomplished by the production of a polymeric material wherein the same or nearly the same degree of polymerization is maintained throughout. The present process does not, of course, result in products having a completely uniform degree of polymerization. However, the present process does result in a much more uniform product than those produced by the continuous processes of the prior art and represents a distinct advance over the prior art in this respect. In fact, it may be said that, for practical purposes, where the process is used to produce rubber-like materials, the uniformity of the product is sufficiently good for all practical purposes.

It is apparent that the present invention is not limited to the specific examples, but that suitable changes may be made therein without departing from the spirit and scope thereof, and, therefore, it is not intended to be limited except as indicated in the appended claim.

We claim:

A continuous process for preparing dispersions of polymerized chloro-2-butadiene-1,3, which comprises dispersing the chloro-2-butadiene-1,3 monomer in an aqueous medium and effecting polymerization thereof by introducing the dispersion into the upper part of a polymerization zone while continuously drawing off the polymerized chloro-2-butadiene-1,3 from the bottom of the zone, the flow of the dispersion downward through the polymerization zone being maintained in a non-turbulent state whereby mixing of the dispersion during the polymerization is largely avoided and uniform polymerization of the monomer is effected, and maintaining the temperature in successive portions of the polymerization zone at that required to effect progressive polymerization to a point where the dispersion of the polymerized chloro-2-butadiene-1,3 has a density of about 1.06 at 20° C.

WILLIAM S. CALCOTT.
HOWARD WARNER STARKWEATHER.